United States Patent
Xu et al.

(10) Patent No.: US 7,330,710 B1
(45) Date of Patent: Feb. 12, 2008

(54) PRIVATE EMERGENCY OR SERVICE-SPECIFIC CALL APPROACH IN GSM SYSTEMS

(75) Inventors: Xiaode Xu, Freemont, CA (US);
Wenfeng Huang, Cupertino, CA (US);
Ian L. Sayers, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 09/866,895

(22) Filed: May 29, 2001

(51) Int. Cl.
*H04M 11/04* (2006.01)
(52) U.S. Cl. .............................. 455/404.1; 455/404.2; 455/509; 455/512; 455/513; 370/95.1; 370/95.2
(58) Field of Classification Search ................. 455/450, 455/454, 464, 404, 512, 513, 509, 404.1, 455/404.2; 370/95.1, 95.2
See application file for complete search history.

(56) References Cited

U.S. PATENT DOCUMENTS 5,226,075 A * 7/1993 Funk et al. .................. 379/243

(Continued)

FOREIGN PATENT DOCUMENTS

JP 63045952 A * 2/1988

(Continued)

OTHER PUBLICATIONS

GSM Specification 4.08, V7.12, Release 1998, consisting of 6 unnumbered pages.

*Primary Examiner*—Matthew Anderson
*Assistant Examiner*—Sujatha Sharma
(74) *Attorney, Agent, or Firm*—Hamilton, Brook, Smith & Reynolds, P.C.

(57) ABSTRACT

A technique for implementing Special Call Services (SCS) to extend wireless system functionality to include private emergency or other types of service-specific special calls in a private network. In a preferred embodiment, the capability is implemented by taking advantage of certain service type elements that may be coded in the Radio Resource Management (RR) functional layer channel request message and/or the Mobility Management (MM) functional layer call request messages in a Global System for Mobile (GSM) communication system. Specifically, an establishment cause field in a RR channel request message and/or a service type field in a MM request message is used to request such services from the network. These establishment causes and service types can be defined, but not limited to, using those codes currently defined as reserved by GSM Version 4.08, Section 9.1.8 and Section 10.5.3.3. Thus, these newly added codes do not require any re-programming of the deployed GSM equipment and impact on their current operation, either. A GSM system that implements the invention preferably contain a Radio Resource (RR) functional entity that watches for a newly added SCS causes and takes them into account when granting physical resources to the requesting unit. Such actions may include, but are not limited to, dropping a normal call-in-process in order to accommodate the SCS call if there are no free physical resources left, prioritizing SCS calls in progress, or other techniques for allocating a physical channel to the SCS channel request. Such techniques may include allocating radio resources which are reserved in advance for the SCS cause.

68 Claims, 6 Drawing Sheets

U.S. PATENT DOCUMENTS

| | | | |
|---|---|---|---|
| 5,278,833 A | 1/1994 | Crisler et al. | 370/95.1 |
| 5,297,144 A | 3/1994 | Gilbert et al. | 370/95.2 |
| 5,455,855 A * | 10/1995 | Hokari | 379/229 |
| 5,574,977 A | 11/1996 | Joseph et al. | 455/58.1 |
| 5,680,446 A * | 10/1997 | Fleischer et al. | 379/114.28 |
| 5,737,338 A | 4/1998 | Eguchi et al. | 371/20.5 |
| 5,774,535 A | 6/1998 | Castro | 379/144 |
| 5,787,080 A | 7/1998 | Hulyalkar et al. | 370/348 |
| 5,805,581 A | 9/1998 | Uchida et al. | 370/35 |
| 5,862,485 A * | 1/1999 | Linneweh et al. | 455/450 |
| 5,884,174 A | 3/1999 | Nagarajan et al. | 455/436 |
| 6,139,031 A * | 10/2000 | Wingard | 280/14.28 |
| 6,205,216 B1 * | 3/2001 | Slater et al. | 379/229 |
| 6,385,458 B1 * | 5/2002 | Papadimitriou et al. | 455/456.2 |
| 6,477,362 B1 * | 11/2002 | Raith et al. | 455/404.1 |
| 6,680,998 B1 * | 1/2004 | Bell et al. | 379/37 |
| 6,819,920 B2 * | 11/2004 | Shi et al. | 455/414.1 |
| 6,970,719 B1 * | 11/2005 | McConnell et al. | 455/554.1 |

FOREIGN PATENT DOCUMENTS

JP          11243447 A  *  9/1999

* cited by examiner

| SCS CAUSE | CODE 96 | Number 95 | Priority 97 |
|---|---|---|---|
| Campus police | 0111 | 567 1212 | 10 |
| Campus maint | 1001 | 5673000 | 6 |

FIG. 6

PRIVATE EMERGENCY OR SERVICE-SPECIFIC CALL APPROACH IN GSM SYSTEMS

BACKGROUND OF THE INVENTION

The present invention relates generally to wireless communications and in particular to a technique for implementing private emergency call services.

Trends in wireless communication systems such as cellular mobile telephone systems, Personal Communication Services (PCS) systems, and the like, for the most part continue to suggest digital techniques are preferred for radio modulation. Although competing standards have been implemented in certain areas, the Global System for Mobile (GSM) communication is the most widely implemented wireless system in the world.

The architecture of a GSM system can be broadly divided into three subsystems, including a Mobile Station, a Base Station Subsystem, and a Network Sub-System. The mobile station (MS) is the portable subscriber or user equipment with which most people are familiar. The Base Station Subsystem (BSS) is typically considered to be composed of two parts, a Base Transceiver Station (BTS) and a Base Station Controller (BSC). The BTS typically houses radio transceivers that are used to communicate signals over the air within a particular cell and handles the radio interface protocols (referred to as the Um protocols in GSM terminology) that permit the mobile station to communicate with the BSS. The BSC manages the radio resources for one or more BTS's across an interface known as the Abis interface. This functionality is concerned with managing the available radio channels such as set up, tear down, frequency assignment, and the like, as well as the required handover processing needed to continue a call in progress as a mobile station moves from cell to cell.

The central component of a GSM system is the Mobile Switching Center (MSC). The MSC acts as a switching node of a Public Switched Telephone Network (PSTN), but also provides other services needed in a mobile telephone system such as subscriber registration, authentication, location update, inter-MSC handovers, and call routing to permit subscriber roaming. These services are provided in conjunction with four intelligent databases known as the Home Location Register (HLR), Visitor Location Register (VLR), Equipment Identity Register (EIR), and Authentication Center (AuC). These databases form the remainder of the so-called Network Sub-System (NSS) and perform administrative functions such as obtaining the location of subscribers within the network, roaming administration for mobile stations located in cells which are not part of their home area, equipment authentication and security, as well as user authentication.

Like other modern communication systems, a GSM network makes use of Open Systems Interconnect (OSI) type layered protocol to define messaging and various other functionalities. The Layer 1 (L1) or physical layer of a GSM system is generally considered to be the aforementioned Um interface defining specific radio signalling between the MS and BTS. Over the land network, such as between the BTS and BSC, L1 may be implemented with standard telephone cabling, optic fiber microwave transmission, or other physical media used for moving digital telephony signals.

Layer 2 (L2) of GSM is a data link layer responsible for the packaging of data to be transmitted. The most widespread method for such framing is a high level data link control (HDLC) protocol known as LAPD.

Of specific concern to the present invention is the Layer 3 (L3) or network layer of GSM. This layer prescribes the path a message needs to take and who the recipient of that message is, maintaining all information necessary to route a packet to its intended destination.

Within Layer 3, the GSM standard further defines functional layers which perform certain tasks known as Radio Resource management (RR), Mobility Management (MM), and Connection Management (CM). The RR functional layer is responsible for providing a reliable radio link between the MS and the network infrastructure. This includes the establishment and allocation of radio channels, as well as performing handover processing, an essential element of cellular systems. Handover processing involves coordination of the mobile station, the BSS, and even the MSC to some degree.

The MM functional layer of Layer 3 within GSM assumes a reliable RR connection. The MM functional layer is responsible for location management and security. Location management involves procedures for updating the position of a mobile station so that the mobile station's current location is always properly stored at the HLR. This permits incoming calls to be properly routed. The MM layer also involves functions required for authentication of the mobile to prevent unauthorized access to the network, using the AuC database.

The CM functional layer is divided into Call Control (CC), Supplementary Services (SS), and Short Message Service (SMS) sublayers. Basically, the first two sublayers are responsible for routing, establishment, maintenance and release of calls. The third sublayer also provides certain supplementary services, such as a short message service that delivers data messages.

SUMMARY OF THE INVENTION

While the Global System for Mobile (GSM) standard specifies an elegant division of functionality according to the OSI layered protocol reference model, this partitioning of functionality into layers is prone to some problems in certain instances.

For example, the standard GSM system is only capable of serving one emergency call. The call is automatically directed to a designated Public Emergency Call Handling Center. In particular, if a GSM mobile user makes an emergency call, that call would typically be directed to a public "911" emergency service center. While this model works well in a public network, such a service is insufficient when a GSM system is deployed to replace a private wired telephone system such as a Private Branch exchange (PBX) that services in-office, in-building, or on-campus call services. In such a private communication environment, certain emergency and/or other service specific call services are often attended to internally, and should be directed to in-house security personnel. In the past, these types of services were achieved by specifically allocating certain internal, different phone numbers. These internal phone numbers are therefore very different from their public counterparts, like the "911" service familiar in the United States. Similarly, public based PLMNs sometimes provide other secondary or other service specific call services. But the current GSM system is incapable of distinguishing such kinds of secondary service-specific call services from the usual call services.

The present invention seeks to alleviate these difficulties by providing a type of call service referred to herein as Special Call Services (SCS). These services can be implemented to extend wireless system functionality to include private emergency call or other types of private, service-specific special calls. The capability is implemented by taking advantage of certain type elements that may be coded in a channel request message and/or a service request message to indicate a special-call-service channel establishment cause (SCS cause) and a special-call-service service type code (SCS 5 code) respectively. Such a message may include, but is not limited to, a Radio Resource (RR) layer Channel Request message and a Mobility Management (MM) layer CM Service Request message.

Specifically, the invention provides this functionality by specifying a service type using a service type information element (IE) that is in turn contained in a service request message that is used to request Special Call Services (SCS) functions from the network. These special call service types are defined in the preferred embodiment using those service type codes defined as "reserved" by GSM Version 4.08, Section 10.5.3.3, although other implementations of the invention may use other service codes or even other message types.

A GSM system that implements the invention also preferably contains a Radio Resource (RR) functional entity that watches for newly added Special Call Services (SCS) causes and takes them into account when granting physical resources to the requesting unit. Such actions may include, but are not limited to, dropping a normal call-in-process in order to accommodate the emergency call if there are no free physical 20 resources left, or other techniques for allocating a physical channel to the SCS channel request. Such techniques may include allocating radio resources that have been reserved in advance for supporting SCS functions.

Each of these newly added SCS causes can bear a configurable priority parameter which is then used to decide if new SCS causes have higher priority than other calls in progress. This enables newly added SCS causes to take over physical resources currently occupied by an earlier call resulting from an SCS cause with lower priority, or even other, lower priority, non-SCS calls in progress. In a preferred embodiment, any such newly added SCS causes should not, however, be allowed to tear down an in-process standard GSM emergency call.

Modifications are also made to the Mobility Management (MM) layer to support SCS functions according to the invention. This layer can be programmed to assume responsibility for setting up the service specified in the Service Request message, as indicated by the added SCS service codes. The MM layer can apply whatever verification is needed, either standard GSM authentication or other proprietary verification schemes, to the Service Request message in order to decide if the requested SCS is acceptable or not.

Valid numbers associated with SCS may either be private extensions or public phone numbers. These phone numbers are allocated or configured to correspond to specific service codes. Once an SCS number is dialed, the mobile equipment uses the corresponding SCS cause and SCS service code to send a Channel Request message and a Service Request message back to the base transceiver station. This mapping between SCS numbers and SCS causes and service codes is preferably configurable at both the mobile and network sites. Except for the specific handling required to support these newly defined SCS codes and causes, the system can otherwise perform as already defined in the standard GSM Mobile Originating Call Procedures.

It should also be understood that the call setup required to support the SCS may proceed using either the already defined GSM standard call setup procedures or special procedures, specific to the private network in use. SCS call setup can use either telephone numbers that are specially allocated to supporting the SCS functions, or SCS-related soft menus or even other, proprietary setup mechanisms and procedures for setup of a call within the associated private network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a table maintained for the Mobile Station to determine when a special call is being made, and by the Base Station Controller, to determine call set up procedures.

DETAILED DESCRIPTION OF A PREFERRED EMBODIMENT

Figure 1:
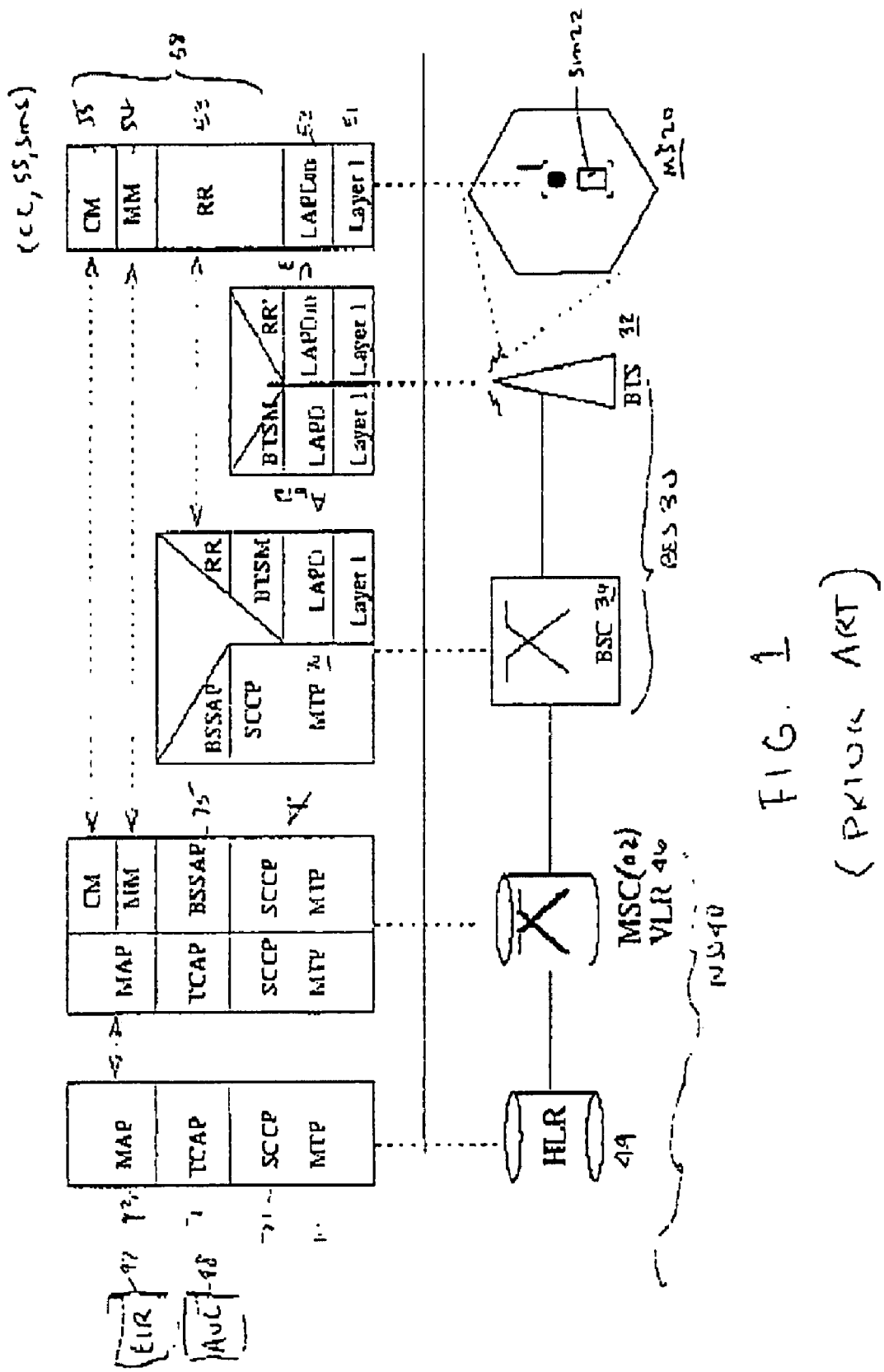
FIG. 1 is a system block diagram of a Global System for Mobile (GSM) communication system.

Turning attention to FIG. 1, the functional architecture of a GSM system 10 can be broadly divided into subsystems including a mobile station (MS) 20, a Base Station Subsystem (BSS) 30, and a Network Sub-System (NSS) 40. Each subsystem is comprised of functional entities which communicate through various interfaces using protocols specified by the GSM standard.

The mobile station 20 in GSM is really two distinct entities. The actual hardware is the mobile equipment, which is the equipment which the subscriber or user carries. Subscriber information, which includes a unique identifier called the International Mobile Subscriber Identity (IMSI), is stored in a Subscriber Identity Module (SIM) 22, typically implemented as a smart card. By inserting the SIM card in any GSM mobile equipment, a user is able to make and receive calls at that terminal and receive other services to which the user has subscribed. By decoupling subscriber information from a specific terminal, greater personal mobility is provided to GSM is users than for other wireless systems.

The Base Station Subsystem (BSS) 30 is composed of two parts, the Base Transceiver Station (BTS) 32 and the Base Station Controller (BSC) 34. The BTS 32 houses radio transceivers that define a cell and handle the radio (Um) interface protocols with the mobile station 30. Due to the potentially large number of BTSs 32 in a system 10, the requirements for a BTS 32 are ruggedness, reliability, portability, and minimum cost.

The Base Station Controller (BSC) 34 manages radio resources for one or more BTSs 32 across the Abis interface. This functionality includes management of the radio interface channels (setup, tear down, frequency hopping, etc.) as well as handovers.

A central component of the Network Sub-System 40 is the Mobile Switching Center (MSC) 42. It acts like a typical switching node of a Public Switched Telephone Network (PSTN) or Integrated Services Digital Network (ISDN). In addition, the MSC provides all the functionality needed to handle a subscriber mobility, including registration, authentication, location updating, inter-MSC 42 handovers, and call routing to roaming subscribers. These services are provided in conjunction with four intelligent databases, which together with the MSC 42 form the Network Sub-System (NSS) 40. The MSC 42 also provides connections to the public wireline terrestrial networks.

While the network side of the system, including the BTS, BSC, and MSC are suggested as encompassing different physical machines in FIG. 1, it should be understood that they may all be implemented in the same physical hardware so that physical layer interfaces Abis and A are not required.

The Home Location Register (HLR) 44 is a database which contains administrative information for each subscriber registered in the corresponding GSM network 10, along with the current location of the subscriber. The location information assists in routing incoming calls to the mobile station 20, and is typically the Signalling System 7 (SS7) address of the visited MSC 42. There is logically one HLR 44 per GSM network 10, although it may be implemented as a distributed database.

The Visitor Location Register (VLR) 46 contains selected administrative information from the HLR as necessary for call control and provision of the subscribed services for each mobile currently located in the geographical area controlled by the VLR 46. Although the VLR 46 can be implemented as an independent unit, most manufacturers of switching equipment implement the VLR 46 together with the MSC 42 so that the geographical area controlled by the MSC 42 corresponds to that controlled by the VLR 46. The proximity of the VLR 46 to the MSC 42 also speeds up access to information that the MSC 42 requires during a call.

Two other registers are used for authentication and security purposes. The Equipment Identity Register (EIR) 47 is a database that contains a list of all valid mobile equipment on the network, where each mobile equipment is identified by its International Mobile Equipment Identity (IMEI). An IMEI is marked as invalid if it has been reported stolen or is not type approved. The Authentication Center (AuC) 48 is a protected database that stores a copy of a secret key stored in each subscriber's SIM card 22, used for authentication and ciphering of the radio channels (Um).

In any telecommunication system, signalling is required to coordinate the necessarily distributed functional entities of the network. The transfer of signalling 10 information in a standard GSM system follows the layered Open System Interconnect (OSI) model.

Radio transmission forms the lowest functional Layer 1 in a GSM system 10.

On top of the physical Layer 1 (L1) is a data link Layer 2 (L2) providing error-free transmission between adjacent entities, in GSM, the Layer 2 protocol is based on is the ISDN LAPD protocol for the Um and Abis interfaces, and on SS7 Message Transfer Protocol (MTP) 70 for the other interfaces.

Functional layers within Layer 3 (L3) are responsible for Radio Resource management (RR), Mobility Management (MM), and Connection Management (CM).

The RR functional layer 53 is responsible for providing a radio link between the mobile station and the network infrastructure. This includes the establishment and allocation of radio channels on the Um interface, as well as the establishment of A interface links to the MSC 42. Handover procedures, an essential element of cellular systems, is managed at this layer, which involves messaging between the mobile station, the BSS 30, and, to a lesser degree, over the MSC 42. Several protocols are therefore used between the different network elements to provide RR functionality.

The MM functional layer 54 assumes a RR layer 53 connection, and is responsible for location management and security. Location management involves procedures and signalling for location updating, so that a current location of each mobile station 20 is stored at the HLR 44. This information is necessary to properly route incoming calls. Security involves the authentication of the mobile station, to prevent unauthorized access to the network, as well as the encryption of all radio link traffic. The protocols in the MM layer 54 communicate with the SIM 22, MSC 42, VLR 46, and the HLR 44, as well as the AuC 48 (which is closely tied with the HLR). These machines in the Network Sub-System (NSS) exchange signalling information through the Mobile Application Part (MAP) 70, which is built on top of Signalling System 7 (SS7).

The CM functional layer 55 is divided into three sub-layers. A Call Control (CC) sub-layer manages call routing, establishment, maintenance, and release, and is closely related to ISDN call control. The idea is for the CC sub-layer to be as independent as possible from the underlying specifics of the mobile network. Another sub-layer is the Supplementary Services (SS) function, which manages the implementation of various supplementary services, and also allows users to access and modify their service subscription. A final sub-layer is the Short Message Service layer (SMS), which handles the routing and delivery of short messages, both from and to the mobile subscriber.

Still other layers are associated with other functionality of the NSS 40. For example, a Signalling Connection Control Part (SCCP) 71, also built upon an SS7 protocol stack, is responsible for routing messages between signalling points. The message transfer part (MTP) 70 provides the functionality of OSI Layers 1, 2, and 3 to provide reliable transport of signalling data to SS7 user parts. TCAP 72 and MAP 73 provide, respectively, Layers 4 through 6 and Layer 7 functionality within the NSS 40.

A Base Station Subsystem Application Part (BSSAP) 75 supports paging and other RR messages exchanged between the MSC 42, and BSC 34 control task messages.

Figure 3:
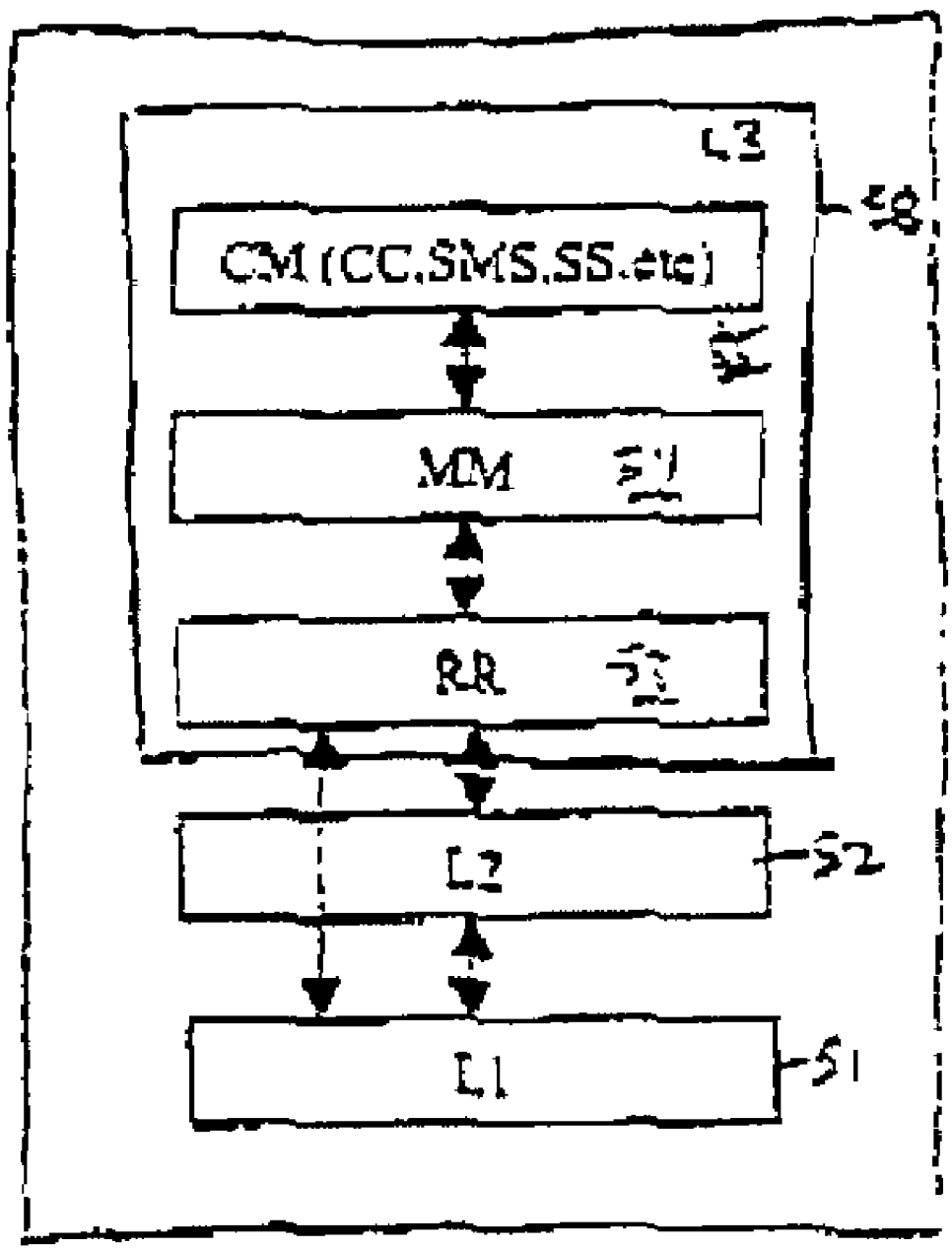
FIG. 3 is a more detailed diagram illustrating how the GSM protocol stack components reside within a layered configuration.

Turning attention now to FIG. 3, the present invention will be described more particularly. The standard GSM reference model implementation considers various components of the RR 53, MM 54, and CM 55 to be distributed among the mobile station 20 as well as the BTS 32, BSC 34, and MSC 42. However, within the mobile station 20 and within certain so-called super base stations (which implement MSC 42, BSC 34, and BTS 32 functionality within the same physical hardware), these functions are typically considered to be built upon a layered model as shown in FIG. 3.

Specifically, messages travel from Layer 1 (LI) to Layer 2 (L2) as per the standard OSI layered protocol model. Except for Radio Resource management (RR) 53 messages intended for Layer 1, normal over-the-air messages, that is, messages traveling over the Um interface, are typically passed up and down between the sub-layers. For example, transmission of a CM 55 message will cause the message to step down layers, one by one, to the MM 54, the RR 53, into Layer 2 and finally to Layer 1 which then sends the message over the air. In this layered model, both the RR 53 and MM 54 in effect bear a multiplex function on behalf of the layers above them. They process messages intended for themselves but pass along messages intended for higher level layers.

Figure 2:
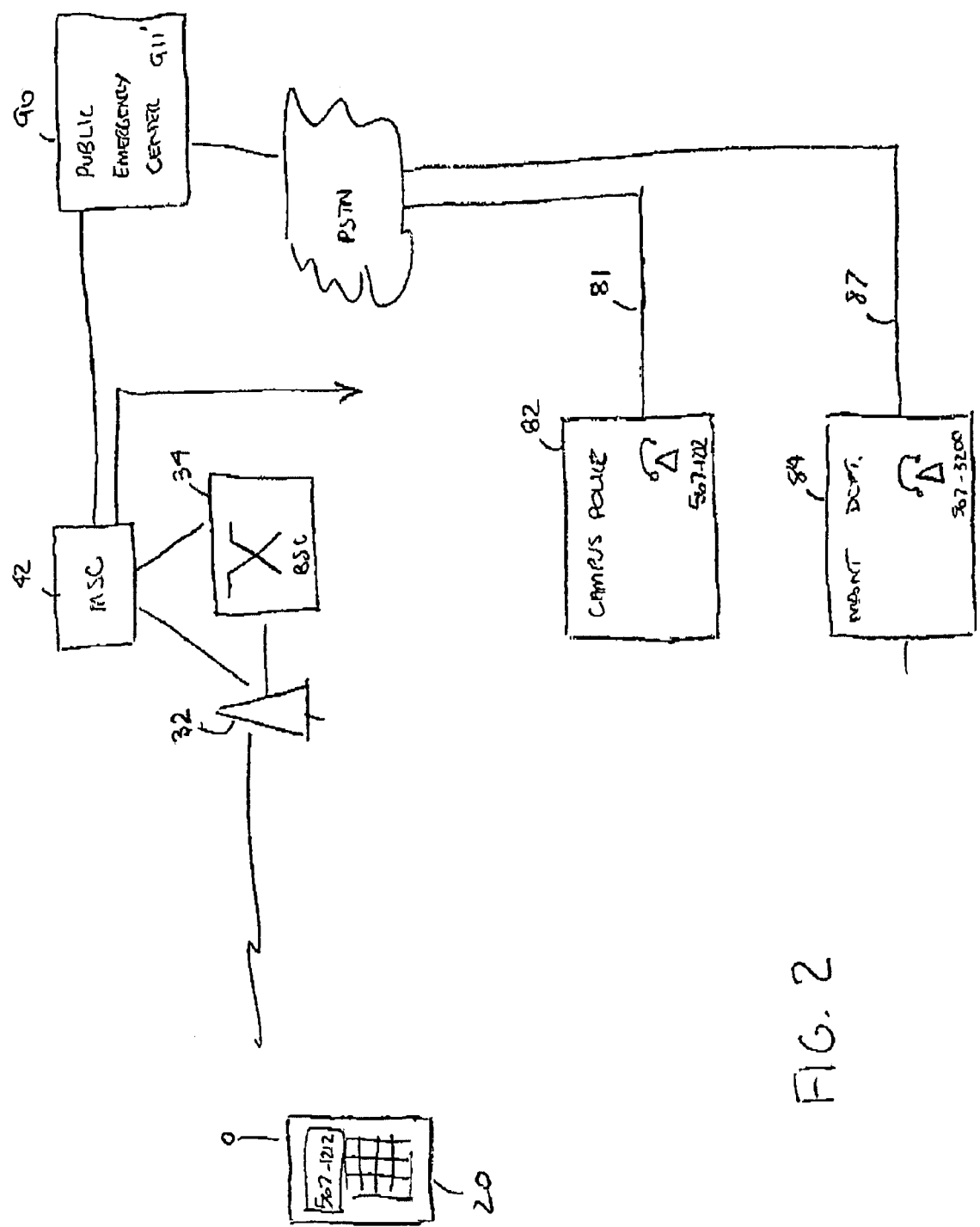
FIG. 2 is a system diagram illustrating how a private emergency call or other special call can be detected and routed according to the invention.

Referring now to FIG. 2, there is illustrated a process by which a typical call is handled and the manner in which a call, such as a private emergency call or other Special Call Services (SCS) specific call, is handled in accordance with the invention. A call originating at a Mobile Station (MS) 20 is being directed as a private emergency or other service-specific call. In this particular illustration, the user of the MS 20 is a student on a university campus where a campus police department 82 provides certain local emergency services. It is desirable for the emergency calls placed by students using Mobile Stations 20 to be routed through a local, private telephone network instead of a public network.

Specifically, the user of the Mobile Station 20 dials the telephone number of the campus police, such as at 567-1212. The SCS call is then recognized by and established by the BTS 32, BSC 34 and MSC 42 and then routed to the Campus Police station using a Special Call Services (SCS) function according to the invention.

The present invention takes advantage of the fact that the GSM system 10 has been deployed in a private context such as an in-office, in-building, or on-campus environment. In this private communication environment, the emergency call placed to 567-1212 is recognized by both the mobile station 20 and BSC 34 and is handled appropriately, depending upon the service requested and/or the telephone number dialed, so that the call is routed to a private emergency call center, e.g., the campus police in a manner which is appropriate for an emergency call, such as by using or allocating special radio channels or dropping radio channels allocated to other non- emergency calls already in progress to assure that sufficient resources are available for handling the emergency call.

Other non-emergency services such as, for example, a call to report a leaking water pipe a maintenance department 84 at telephone number 567-3200, can also be recognized by the BSC 34 and handled using SCS functions according to the invention.

In order to implement these private emergency and other special call services functions according to the invention, either new messages may be introduced or simply certain extensions are made to the standard messages used in the GSM system, as well as to the functional entity layers implemented in the BSS 30 and MSC 42.

Figures 4, 5:
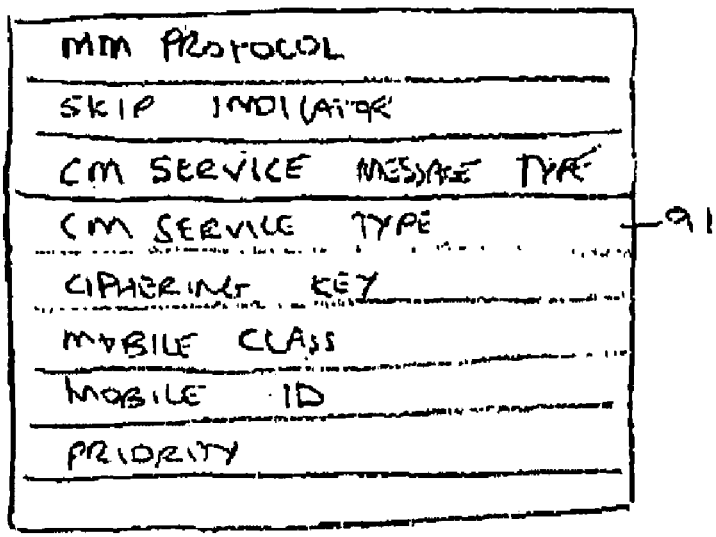
FIG. 4 illustrates the format of a Mobility Management (MM) layer Service Request Message.
FIG. 5 illustrates one possible assignment of Service Type codes to special call services.

FIG. 4 describes in greater detail how to extend standard GSM messages to realize the SCS functions desired. An initial step in designing a system which operates according to the invention is to determine a service code to represent each of the available special call services (SCS) service types. These services types can then be implemented in an appropriate Service Request Message handled by the CM 55 function at the time call setup is performed.

FIG. 4 shows the format of a CM service request message as defined, for example, in the GSM specification 04.08. This message is the message originated by the mobile station 20 to the network at the MM layer to request a service for connection management sublayer entities. The GSM specification defines this service request message as enabling circuit switch connection establishment, supplementary services activation, short message transfer, location services, and other functions. Thus, upon establishing a call, the mobile station may include a special service type field 91 as part of a CM service request message 92.

The service type field 91 may take the form of a four bit Information Element (IE). The Information Elements for the various SCS services may be coded as shown in FIG. 5. Certain four bits values are predefined by the GSM standard itself. For example, service type code 0001 is already allocated for defining a mobile originated call establishment or packet mode connection establishment. Similarly, code 0010is already defined for emergency call establishment such as to the public emergency call center.

It is evident, however, that only seven codes are pre-defined as Information Elements. Therefore, up to nine additional private codes may be introduced with the remainder of the unused bit combinations. A code '0111' has been reserved to designate a campus police call. Code '1001' has been reserved for calls to the campus maintenance department.

An additional table such as that shown in FIG. 6 therefore provides a mapping between the telephone number and SCS causes or service codes. This table, which may be configurable table, is maintained at both the mobile and network sides. Thus, valid phone numbers 95 may be associated with individual service type codes 96. So, for example, in the case where the telephone number 567-1212 is to be routed to the campus police department 85, the number 567-1212 is maintained in the table so that its relationship with associated SCS service code '0111'. Similarly, a service code '1001' has been associated with the telephone number 567-3000 for the maintenance department.

Call priorities 97 may also been assigned to specific SCS service types.

Figure 7:
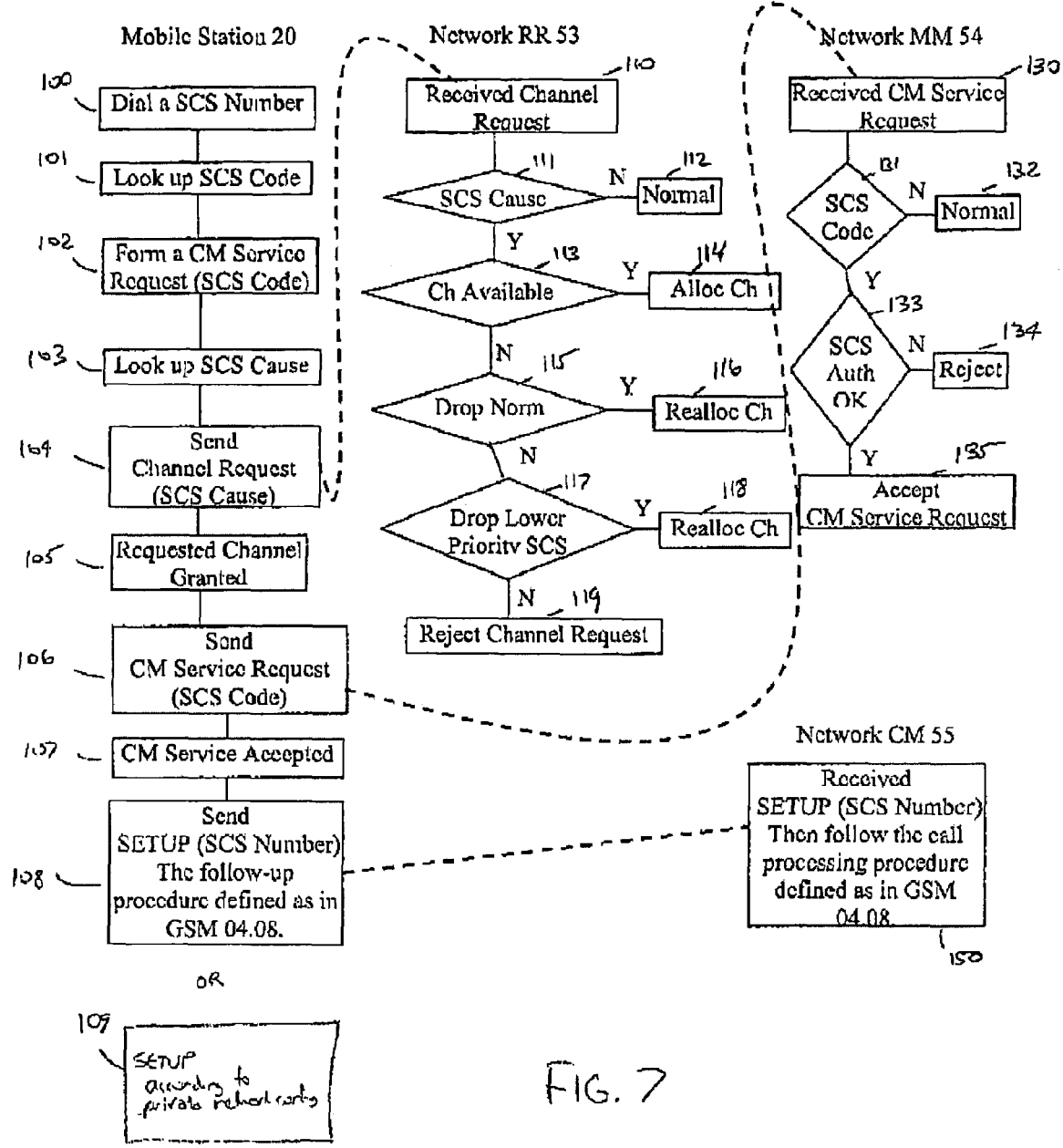
FIG. 7 is a process flow diagram illustrating how the Mobile Station and the Mobility Management (MM) and Radio Resource (RR) layers handle the private emergency or other Special Call Services (SCS) request.

FIG. 7 is a flow chart of the operations performed by the Mobile Station 20, as well as the RR 53, MM 54, and CM 55 functional layers of the BSC 34 and MSC 42 in order to implement the invention. For the perspective of the Mobile Station 20, it is understood that at a time prior to making a call, the SCS cause map is created (i.e., the table in FIG. 6). This may be done, for example, under operators' control via either (re)programming the mobile station 20 or automatically, via an over-the-air (OTA) procedure.

At a subsequent time, the user of the Mobile Station 20 dials a telephone number or selects a soft menu item associated with one of the SCS services. This results in a request to initiate a call, in state 100. Following that, a state 101 is entered in which the SCS cause map 93 is searched to determine an associated SCS code. In particular, the dialed number or the selected SCS is checked against the SCS cause map 93 to determine if there is an associated SCS code. If the SCS cause map 93 does not have the dialed number or SCS code stored within it, then the call is handled as a normal call. (The details of standard call set up processes are not shown in detail in FIG. 7 or described further herein, such processes being well known in the art).

If, however, the number does have a corresponding SCS service code entry, then in state 102 a CM Service Request is formulated. Specifically, in state 102, the CM service request message 92 is formatted containing the CM service type code as indicated by the associated service code 96. Next, in state 103, the corresponding SCS cause for the associated service code 96 is determined by examining the contents of the SCS table. In state 104, a Channel Request message is formed and sent at the RR layer for the new cause.

Once a radio resource, e.g., a physical radio channel is allocated to the new SCS cause in state 105, processing continues to state 106. Here, the CM Service Request lo message formulated in state 102 can be sent. Specifically, this is directed over the allocated channel to the MM layer 54.

In state 107, upon a return acknowledgement from the MM layer 54, the new CM Service Request has been accepted, and the call can proceed as requested.

In state 108, the new call is established for the SCS cause. In this instance, specifically, the call is established using a standard SETUP message to the indicated SCS number associated with the SCS cause (for example, to the campus police at 567-1212). The SETUP and any following procedures can then occur as specified in the GSM 4.08 standard.

Alternatively, a special call establishment procedure or resource may be utilized for servicing the requested SCS. In this instance, a SCS SETUP message may be introduced corresponding to the SCS codes. As such, CM 55 is responsible for mapping each individual SCS code to its corresponding phone number and for routing the SCS call to that number appropriately. In such an instance, a state 109 is entered instead of state 108, where the SCS call is set up according to functions that may be available in 25 the associated private network. For example, the emergency call to the campus police may be routed over an internal network by the CM layer 55.

Once the Channel Request message is sent from the MS 20 in state 104, the RR layer on the network side enters a state 110. In this state, the RR layer 53 examines the received Channel Request message to determine if special handling is needed. This determination is made in state 111. If not, then a state 112 is entered in which the call will be handled normally. If, however, a special SCS service cause indication is present, then a state 113 is entered.

In this state 113, if RR layer radio channels are available for use, then processing can continue to a state 114 where an available radio channel is allocated to the new SCS cause.

If sufficient channel resources were not available in state 113, then the RR 53 can enter a state 115 in which it determines whether an existing normal call in process can be dropped in order to handle the presently requested SCS. If this, indeed, can be done, then another normal call in process will be dropped and a state 116 will be entered in which the radio resource will be reallocated to the new SCS cause.

If, however, in state 115, no normal calls in progress can be dropped, then a state 117 may be entered in which it can be determined if other SCS calls in progress may be dropped to service the newly requested call. For example, if all presently available channels are assigned to SCS in progress calls, a call being made to a maintenance department may be assigned a lower priority than those to the campus police department. In such a case, the new call having a higher priority can cause entry to state 118 in which the SCS call in progress is dropped in favor of the higher priority new call. Otherwise, in state 119, the channel request for the new SCS cause needs to be rejected by the RR layer 53.

Thus, it can be seen that the RR 53 functional entity may watch newly added SCS causes and take them into account when granting available physical resources to the channel request needed to service the SCS cause. Current normal calls in progress can be dropped if no physical resources are left, or new SCS causes that have a higher priority can take over physical resources currently occupied by a call resulting from an SCS cause with lower priority.

It should be understood that the processing of states 114, 116, and 118 will normally not be allowed to tear down a currently defined GSM emergency call if any such call is in progress.

Recall that in state 106, the MS 20 had sent the CM Service Request. The MM 54 layer on the network side recognizes such received CM service request message in state 130. The message is then examined to see if it has a recognizable SCS code in state 131. If not, then the call is handled as a normal call would be in state 132.

If, however, the CM service request message does contain an SCS code indicating either a private emergency or other service-specific call, then a state 133 is entered to determine if it is authorized or verified. The MM 54 can, at this point, apply whatever verification is needed using either standard GSM authentication or other proprietary verification procedures. This can assist in determining whether the requested SCS service is acceptable and/or authorized for the particular user.

If the authorization procedures fail, then the CM service request is rejected, in state 134.

Otherwise, if the service request is authorized, then it is accepted, in state 135.

At the CM layer 55, it is also recognized that standard call establishment procedures can be used to set up the call. For example, any valid phone number, either private extensions or public telephone numbers, can be allocated or configured for the SCS service codes. These are typically defined on a one-by-one basis corresponding to the defined SCS service codes. Except as above, an SCS call is handled according the already-defined standard GSM mobile originating call procedures such as those defined in GSM standard 04.08 version 5.9.0.

The approach permits implementation in both private GSM based networks servicing a private area such as an office, building, or in-campus area, as well as general public networks. The invention provides, in addition to routing public emergency call services such as a 911 emergency on the secondary emergency numbers, other special service specific numbers that may be allocated for use and efficient routing according to the invention.

The invention thus provides a solution to the problem in current GSM system architectures in which only one emergency call directed to a public emergency call handling center can be efficiently routed at a time. As a result, private communication environments such as corporations, college campuses, and the like, can provide better service for handling emergency calls, in terms of the number of calls that may be handled simultaneously, and in having greater control over the manner in which such calls are handled.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for setting up a call within a wireless communication system, wherein the wireless communication system is deployed to provide call services to mobile stations (MS) operating in a private network, the method comprising the steps of, specifying at a mobile station:

receiving a request at the mobile station to originate a call, the request a phone number associated with a private service that is supported by the private network;

using the phone number, at the mobile station, to locate a service code in a cause table that maps phone numbers to service codes wherein the service code identifies the private service;

coding a service type field, at the mobile station, into a request message to indicate the private service identified by the located service code; and sending the request message from the mobile station to base station equipment for call setup within the private network.

2. A method as in claim 1 wherein the wireless communication system operates according to certain functional layers, including a radio resource (RR) functional layer (RR), a mobility management (MM) functional layer, and a connection management (CM) functional layer, with at least the radio resource functional layer being normally assumed to be a transport mechanism for the mobility management and connection management layer functions.

3. A method as in claim 2 wherein the wireless communication system is a Global System for Mobile (GSM) system.

4. A method as in claim 3 wherein the service type field in the request message is defined using reserved GSM service type codes.

5. A method as in claim 2 wherein the request message is coded at a mobility management (MM) layer.

6. A method as in claim 2 wherein the radio resource (RR) functional layer additionally performs the steps of:

detecting a newly added special call services (SCS) causes request; and granting physical resources to service the SCS causes request depending upon an SCS cause type and a state of other call types already in process.

7. A method as in claim 6 wherein the step of granting physical resources additionally comprises the steps of:

dropping a normal call-in-process in order to accommodate the call if there are no other free physical resources left; and prioritizing calls in progress.

8. A method as in claim 6 wherein the step of granting physical resources additionally comprises the step of:

allocating radio resources to the call that are reserved in advance for servicing SCS calls.

9. A method as in claim 1 wherein the private service specific call is a private emergency call.

10. A method as in claim 1 wherein the request message is a channel request message.

11. A method as in claim 1 wherein the request message is a service request message.

12. A mobile station (MS) operating in a private network, comprising:

a user interface, for receiving a request at a mobile station to originate a call, the call specifying a phone number associated with a private service that is supported by the private network;

a table, stored in the mobile station, configured to map phone numbers to service codes;

a message coder, located in the mobile station, configured to use the phone number to locate a service code in the table that identifies the private service and code a service type field in a request message to indicate the private service identified by the located service code; and a transmitter, for sending the request message from the mobile station to base station equipment for call setup within the private network.

13. An apparatus as in claim 12 wherein the wireless communication system operates according to certain functional layers, including a radio resource (RR) functional layer (RR), a mobility management (MM) functional layer, and a connection management (CM) functional layer, with at least the radio resource functional layer being normally assumed to be a transport mechanism for the mobility management and connection management layer functions.

14. An apparatus as in claim 13 wherein the wireless communication system is a Global System for Mobile (GSM) system.

15. An apparatus as in claim 14 wherein the service type field in the request message is defined using reserved GSM service type codes.

16. An apparatus as in claim 13 wherein the request message is coded at a mobility management (MM) layer.

17. An apparatus as in claim 13 wherein the radio resource (RR) functional layer additionally comprises:

a receiver, for receiving a newly added special call services (SCS) causes request; and a physical resource manager, that services the SCS causes request depending upon an SCS cause type and a state of other call types already in process.

18. An apparatus as in claim 17 wherein the physical resource manager additionally drops a normal call-in-process in order to accommodate the call if there are no other free physical resources left.

19. An apparatus as in claim 17 wherein the physical resource manager additionally allocates radio resources to the call that are reserved in advance for servicing SCS calls.

20. An apparatus as in claim 12 wherein the private service specific call is a private emergency call.

21. An apparatus as in claim 12 wherein the request message is a channel request message.

22. An apparatus as in claim 12 wherein the request message is a service request message.

23. A computer program product for setting up a call within a wireless communication system, the computer program product located in a mobile station (MS) operating in a private network, the computer program product comprising a computer usable medium having computer readable code thereon, comprising computer code which:

receives a request at the MS to originate a call, the call specifying a phone number associated with a private service that is supported by the private network;

uses the phone number to locate a service code in a cause table, stored at the MS, that maps phone numbers to service codes wherein the service code identifies the private service;

codes a service type field contained in a request message, located at the MS, to indicate the private service identified by the located service code; and sends the request message from the mobile station to base station equipment for call setup within the private network.

24. A computer program product as in claim 23 wherein the wireless communication system operates according to certain functional layers, including a radio resource (RR) functional layer (RR), a mobility management (MM) functional layer, and a connection management (CM) functional layer, with at least the radio resource functional layer being normally assumed to be a transport mechanism for the mobility management and connection management layer functions.

25. A computer program product as in claim 23 wherein the wireless communication system is a Global System for Mobile (GSM) system.

26. A computer program product as in claim 25 wherein the service type field in the request message is defined using reserved GSM service type codes.

27. A computer program product as in claim 24 wherein the request message is coded at a mobility management (MM) layer.

28. A computer program product as in claim 24 wherein the computer code contains a radio resource (RR) functional layer which:
- detects a newly added special call service (SCS) causes request; and
- grants physical resources to service the SCS causes request depending upon an SCS cause type and a state of other call types already in process.

29. A computer program product as in claim 28 wherein the computer code additionally:
- drops a normal call-in-process in order to accommodate the call if there are no other free physical resources left; and
- prioritizes calls in progress.

30. A computer program product as in claim 28 wherein the computer code additionally:
- allocates radio resources to the call that are reserved in advance for servicing SCS calls.

31. A computer program product as in claim 23 wherein the private service specific call is a private emergency call.

32. A computer program product as in claim 23 wherein the request message is a channel request message.

33. A computer program product as in claim 23 wherein the request message is a service request message.

34. A mobile station apparatus (MS) operating in a private network comprising:
- means for receiving a request at the mobile station to originate a call, the call specifying a private service that is supported by the private network;
- means for using the phone number, at the mobile station, to locate a service code in a cause table stored at the mobile station that maps phone numbers to service codes wherein the service code identifies the private service;
- means for coding a service type field contained in a request message at the mobile station to indicate the private service identified by the located service code; and
- means for sending the request message from the mobile station to base station equipment for call setup within the private network.

35. An apparatus as in claim 34 wherein the wireless communication system operates according to certain functional layers, including a radio resource (RR) functional layer (RR), a mobility management (MM) functional layer, and a connection management (CM) functional layer, with at least the radio resource functional layer being normally assumed to be a transport mechanism for the mobility management and connection management layer functions.

36. An apparatus as in claim 35 wherein the wireless communication system is a Global System for Mobile (GSM) system.

37. An apparatus as in claim 36 wherein the service type field in the request message is defined using reserved GSM service type codes.

38. An apparatus as in claim 35 wherein the request message is coded at a mobility management (MM) layer.

39. An apparatus as in claim 35 wherein the radio resource (RR) functional layer additionally comprises:
- means for detecting a newly added special call services (SCS) causes request; and
- means for granting physical resources to service the SCS causes request depending upon an SCS cause type and a state of other call types already in process.

40. An apparatus as in claim 39 wherein the means for granting physical resources additionally comprises:
- means for dropping a normal call-in-process in order to accommodate the call if there are no other free physical resources left; and
- means for prioritizing calls in progress.

41. An apparatus as in claim 39 wherein the means for granting physical resources additionally comprises:
- means for allocating radio resources to the call that are reserved in advance for servicing SCS calls.

42. An apparatus as in claim 34 wherein the private service specific call is a private emergency call.

43. An apparatus as in claim 34 wherein the request message is a channel request message.

44. An apparatus as in claim 34 wherein the request message is a service request message.

45. A method for setting up a call within a wireless communication system, wherein the wireless communication system is deployed to provide call services to mobile stations operating in a private network, the method comprising the steps of:
- receiving a request message from a mobile station to reserve resources for a call, wherein the request message specifies a cause code that represents an establishment cause associated with the call for a private service that is supported by the private network;
- granting resources to service the call depending upon the cause code specified in the request message received from the mobile station and a state of other existing calls in the private network;
- receiving a second request message from the mobile station containing a service type code associated with the private service;
- using the service type code as received from the mobile station to determine if a user associated with the mobile station is authorized to request the private service; and
- accepting the second request if the user is authorized to request the private service.

46. A method as in claim 45 further comprising the step of:
- dropping a normal call-in-process in the private network in order to accommodate the call.

47. A method as in claim 45 further comprising the steps of:
- determining if an existing call in the private network can be dropped; and
- if so, dropping the existing call to accommodate the call.

48. A method as in claim 45 wherein the request message specifies a priority of the call.

49. A method as in claim 48 further comprising the steps of:
- determining if the call's priority is higher in priority than a priority associated with an existing call in the private network; and
- if so, dropping the existing call to accommodate the call.

50. A method as in claim 45 further comprising the step of:
- allocating resources in the private network to the call.

51. An apparatus for setting up a call within a wireless communication system, wherein the wireless communication system is deployed to provide call services to mobile stations (MS) operating in a private network, the apparatus comprising:

a base transceiver station (BTS) configured to receive a request message from an MS for a call, wherein the request message, as received from the MS, specifies a cause code that represents an establishment cause associated with the call for a private service that is supported by the private network;

a base station controller (BSC) configured to:

grant resources to service the call depending upon the cause code as specified in the request message from the MS and a state of other calls existing in the private network, receive a second request message from the MS containing a service type code associated with the private service, use the service type code to determine if a user associated with the mobile station is authorized to request the private service, and accept the second request if the user is authorized to request the private service.

52. An apparatus as in claim 51 wherein the BSC is further configured to drop a normal call-in-process in the private network in order to accommodate the call.

53. An apparatus as in claim 51 wherein the BSC is further configured to determine if an existing call in the private network can be dropped and if so, drop the existing call to accommodate the call.

54. An apparatus as in claim 51 wherein the request message specifies a priority of the call.

55. An apparatus as in claim 54 wherein the BSC is further configured to determine if the priority associated with the call is higher in priority than a priority associated with an existing call in the private network and if so, drop the existing call to accommodate the call.

56. An apparatus as in claim 51 wherein the BSC is further configured to allocate resources in the private network to the call.

57. An apparatus for setting up a call within a wireless communication system, wherein the wireless communication system is deployed to provide call services to mobile stations (MS) operating in a private network, the apparatus comprising:

means for receiving a request message from an MS to reserve resources for a call, wherein the request message, as received from the MS, specifies a cause code that represents an establishment cause associated with the call for a private service that is supported by the private network;

means for granting resources to service the call depending upon the cause code specified in the request message, as received from the MS, and a state of other calls in the private network;

means for receiving a second request message from the MS containing a service type code associated with the private service;

means for using the service type code to determine if a user associated with the MS is authorized to request the private service; and means for accepting the second request if the user is authorized to request the private service.

58. An apparatus as in claim 57 further comprising:
means for dropping a call-in-process in the private network in order to accommodate the call.

59. An apparatus as in claim 57 further comprising:
means for determining if an existing call in the private network can be dropped; and means for dropping the existing call to accommodate the call, if the existing call can be dropped.

60. An apparatus as in claim 57 wherein the request message specifies a priority of the call.

61. An apparatus as in claim 60 further comprising:
means for determining if the call's priority is higher in priority than a priority associated with an existing call in the private network; and means for dropping the existing call if the call's priority is higher in priority than the existing call's priority.

62. An apparatus as in claim 57 further comprising:
means for allocating resources in the private network to accommodate the call.

63. A computer program product for setting up a call within a wireless communication system, wherein the wireless communication system is deployed to provide call services to mobile stations (MS) operating in a private network, the computer program product comprising a computer usable medium having computer readable code thereon, comprising computer code which:

receives a request message from an MS to reserve resources for a call, wherein the request message, as received from the MS, specifies a cause code that represents an establishment cause associated with the call for a private service that is supported by the private network;

grants resources to service the call depending upon the cause code specified in the request message, as received from the MS, and a state of existing calls in the private network;

receives a second request message from the MS containing a service type code associated with the private service;

uses the service type code to determine if a user associated with the MS is authorized to request the private service; and accept the second request if the user is authorized to request the private service.

64. A computer program product as in claim 63 wherein the computer code additionally:
drops a normal call-in-process in the private network in order to accommodate the call.

65. A computer program product as in claim 63 wherein the computer code additionally:
determines if an existing call in the private network can be dropped; and
if so, drops the existing call to accommodate the call.

66. A computer program product as in claim 63 wherein the request message specifies a priority of the call.

67. A computer program product as in claim 66 wherein the computer code additionally:
determines if the priority associated with the call is higher in priority than a priority associated with an existing call in the private network; and
if so, drops the existing call to accommodate the call.

68. A computer program product as in claim 63 wherein the computer code additionally:
allocates resources in the private network to accommodate the call.

* * * * *